United States Patent
Mockett

(12) 
(10) Patent No.: US 7,788,766 B2
(45) Date of Patent: *Sep. 7, 2010

(54) WIRE MANAGEMENT GROMMET WITH NON-CAPTIVE CLOSURE MEMBER

(76) Inventor: Douglas A. J. Mockett, P.O. Box 3333, Manhattan Beach, CA (US) 90266

( * ) Notice: Subject to any disclaimer, the term of this patent is extended or adjusted under 35 U.S.C. 154(b) by 0 days.

This patent is subject to a terminal disclaimer.

(21) Appl. No.: 12/020,271

(22) Filed: Jan. 25, 2008

(65) Prior Publication Data

US 2008/0178421 A1    Jul. 31, 2008

Related U.S. Application Data

(63) Continuation of application No. 11/562,302, filed on Nov. 21, 2006, now Pat. No. 7,383,610, and a continuation of application No. 11/347,398, filed on Feb. 6, 2006, now Pat. No. 7,155,775, and a continuation of application No. 10/981,666, filed on Nov. 5, 2004, now abandoned, and a continuation of application No. 10/736,513, filed on Dec. 17, 2003, now Pat. No. 6,877,184, and a continuation of application No. 10/113,672, filed on Apr. 2, 2002, now Pat. No. 6,694,566, and a continuation of application No. 07/901,684, filed on Jun. 22, 1992.

(51) Int. Cl.
*F16L 5/00* (2006.01)

(52) U.S. Cl. .................. 16/2.1; 174/152 G; 174/153 G; 248/56; 312/223.6; 411/508

(58) Field of Classification Search .................. 174/156, 174/153 G, 65 G, 48, 152 G; 16/2.1, 2.2, 16/2.4; 248/56; 312/223.1, 223.6, 327; 411/5.8, 411/509

See application file for complete search history.

(56) References Cited

U.S. PATENT DOCUMENTS

| | | |
|---|---|---|
| 3,783,175 A | 1/1974 | Timmons |
| 3,857,136 A | 12/1974 | Dean |
| 3,956,573 A | 5/1976 | Myers et al. |
| 4,053,701 A | 10/1977 | Ogilvie et al. |
| 4,344,205 A | 8/1982 | Latino et al. |
| 4,520,976 A | 6/1985 | Cournoyer et al. |
| 4,588,491 A | 5/1986 | Kreisher et al. |
| D285,044 S | 8/1986 | Mockett |

(Continued)

OTHER PUBLICATIONS

Exhibit 47 from Interference No. 103,260, dated Jan. 29, 1991 (3 pages).

(Continued)

*Primary Examiner*—Chuck Y. Mah
(74) *Attorney, Agent, or Firm*—Sanford Astor; Lewis Brisbois Bisgaard & Smith LLP

(57) ABSTRACT

This invention relates to a two-piece grommet adapted for holding a cable in an aperture, such as in a desk or work surface so as to absorb any strain imposed on the cable and to provide an attractive covering for the hole drilled to pass the cable. The grommet consists of two portions. The first portion comprises a cap having an extended flange and adapted to frictionally fit into the cylindrical sleeve and against the lip. The cap has an aperture cut into it through which the cable passes therethrough.

5 Claims, 1 Drawing Sheet

U.S. PATENT DOCUMENTS

| | | | |
|---|---|---|---|
| 4,721,476 | A | 1/1988 | Zeliff et al. |
| 4,730,363 | A | 3/1988 | Asbaghi et al. |
| D296,761 | S | 7/1988 | Mockett |
| D298,494 | S | 11/1988 | Mockett |
| 4,786,225 | A | 11/1988 | Poe et al. |
| 5,144,777 | A | 9/1992 | Fishel et al. |
| 5,167,047 | A | 12/1992 | Plumley |
| 5,189,779 | A | 3/1993 | Fishel et al. |
| 5,276,280 | A | 1/1994 | Ball |
| D354,903 | S | 1/1995 | Mockett |
| D358,980 | S | 6/1995 | Mockett |
| 6,374,455 | B1 | 4/2002 | Regele et al. |
| 6,460,638 | B1 | 10/2002 | Strunsee et al. |
| 6,694,566 | B1 | 2/2004 | Mockett |

OTHER PUBLICATIONS

Exhibit 48 from Interference No. 103,260, dated May 6, 1991 (6 pages).

Exhibit 51 from Interference No. 103,260, dated May 14, 1991 (1 page).

Deposition of Roger Plumley taken Mar. 11, 1994, and exhibits thereto.

Doug Mockett & Co., "Annual Report to our Clients and Friends," pp. 4 and 5 of 1989 stock catalog.

ITW Plastiglide "Stock Catalog" cover, inside cover, and pp. 67-70, 1990.

New Products from Old Rite Inc., 1 sheet, 1990.

Weber Knapp Company "Cord Grommet" cover and inside cover, 1990.

E.B. Bradley Co., "Specialty Hardware and Laminate," p. 262 (1 sheet), 1990.

The Slidex Corp., "Wire Management Products" cover sheet.

Outwater Plastic/Industries "Round Wire Management Grommets," 1990.

Joint Appendix, *Plumley* v. *Mockett*, Appeal No. 99-1486.

Ruling and Statement of Decision, *Doug Mockett & Co.* v. *Roger Plumley*, Superior Court of California, County of Los Angeles, No. BC094386 (8 pages).

Final Decision Under 37 C.F.R. § 1.658, *Mockett* v. *Plumley*, Interference No. 103,260, Sep. 4, 2001 (19 pages).

Request for Reexamination of U.S. Patent No. 5,167,047 dated Jan. 21, 2003.

*Douglas A.J. Mockett* v. *Roger K. Plumley*, "Amended Complaint by Original Inventor to Set Aside Decision of Board of Patent Appeals and Interferences," Civil Action No. 02-8271-R-VGKx.

Answer of Defendant Doug Mockett, Counterclaim for Patent Infringement and Demand for Jury Trial, Case No. 2:04-cv-02868-GHK-Ex.

Complaint for Damages and Injunctive Relief for Patent Infringement, Case No. CV04-2868.

Request for Reexamination of U.S. Patent No. 5,167,047 dated Jan. 13, 2004.

United States Court of Appeals for the Federal Circuit, 05-1028, *Roger Plumley* v. *Douglas Alfred James Mockett*, Judgment, Oct. 21, 2005.

Notice of Motion and Motion to Lift Stay of Action dated Jul. 9, 2004.

Opposition of Plaintiff to Defendant's Motion to Lift Stay of Action dated Jul. 26, 2004.

Reply to Opposition to Motion to Lift Stay of Action dated Aug. 2, 2004.

Civil Minutes-General of Hon. George H. King dated Aug. 24, 2004.

Answer of Defendant Doug Mockett, Counterclaim for Patent Infringement and Demand for Jury Trial dated Sep. 28, 2004.

Reply Brief for Appellant Douglas Alfred James Mockett dated Dec. 20, 1999.

Brief for Appellee Roger Plumley dated Dec. 1, 1999.

Brief for Appellant Douglas Alfred James Mockett dated Oct. 21, 1999.

Brief for Appellant Douglas Alfred James Mockett, Appeal No. 05-1028 dated Dec. 14, 2004.

Request for Reexamination of U.S. Patent No. 5,167,047 dated Jan. 21, 2005.

PTO's Office action dated Apr. 11, 2005.

Brief for Appellee Roger Plumley, Appeal No. 05-1028 dated May 6, 2005.

Reply Brief of Appellant Douglas Alfred James Mockett, Appeal No. 05-1028 dated May 23, 2005.

Joint Appendix, Appeal No. 05-1028 dated May 31, 2005.

Final Office action dated Oct. 4, 2005 of U.S. Appl. No. 10/981,666.

Final Office action dated Oct. 4, 2005 of U.S. Appl. No. 10/981,513.

Notice of Intent to Issue Reexamination Certificate dated Jan. 7, 2004 of U.S. Appl. No. 90/006,520.

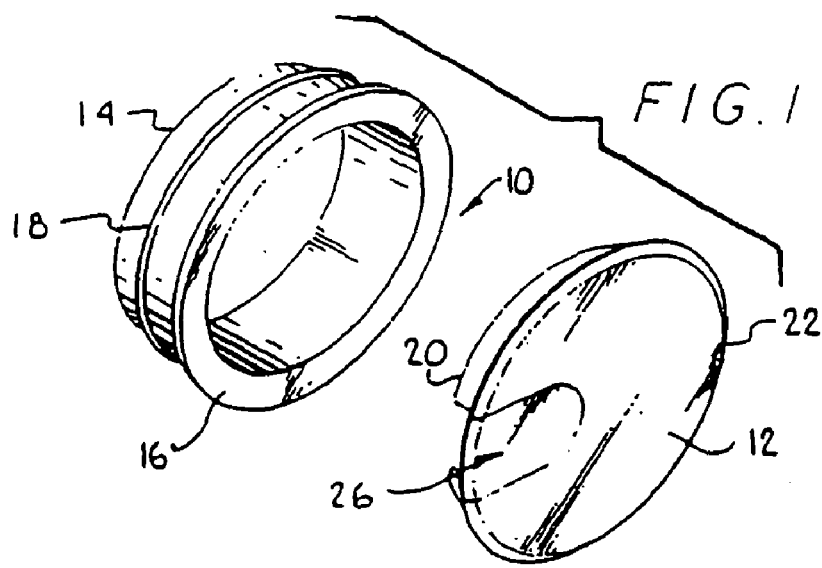
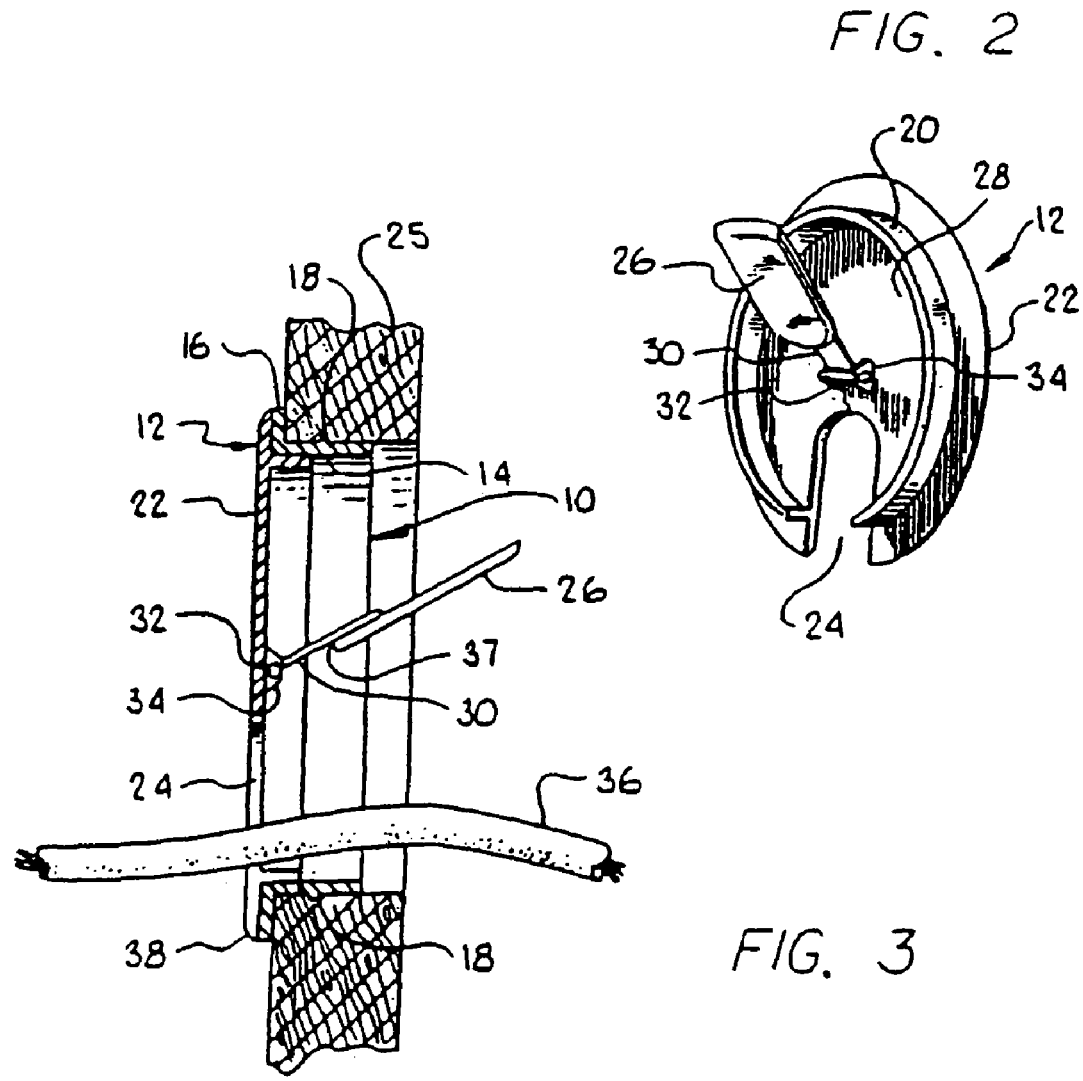

WIRE MANAGEMENT GROMMET WITH NON-CAPTIVE CLOSURE MEMBER

BACKGROUND OF THE INVENTION

Devices for passing a flexible or non-flexible cord, such as a telephone cord or computer cable, through one or more elements such as a desk top, a piece of furniture, a wall or other type of installation are well known. Various devices to do this are known in the art and each of these devices has drawbacks. One device, which is now being used, requires a spring loaded cap which is held in place within a sleeve by the action of the spring. This device is complex, expensive and difficult to use. Other devices consist simply of a cylindrical sleeve in which the hole in the panel or desk must be cut to precisely the exact size or the sleeve will simply fall out, particularly if it is set in a vertical position. If the hole is not cut to the precise size, means must be used to secure the sleeve into the hole.

OBJECTS OF THE INVENTION

It is an object of the present invention to provide a simple, improved device for passing a cable or cord through an aperture in a work surface securing the cord.

It is still a further object of the invention to provide a grommet capable of being held easily in a hole cut into a work surface, for passing an electrical cord.

Still a further object of the invention is to provide a grommet for holding an electrical cord which can be easily held and used in both a vertical and horizontal position.

Still a further object of the invention is to provide a means to close the hole when not in use.

These and other objects will be described by reference to the accompanying drawing in which:

FIG. 1 is a perspective view of the grommet assembly of the present invention.

FIG. 2 is a perspective view of the bottom of the cap portion of the present invention, and FIG. 3 is a side view partially broken away of the cap portion of the grommet of the present invention.

Referring now to the drawings, there is shown the sleeve portion 10 of the grommet of the present invention and the cap portion 12. The sleeve portion comprises a cylindrical hollow sleeve 14, and a lip 16 having a larger diameteeeve 14. The cap portion of the grommet of the present invention comprises a shank portion 20 and a flange or lip portion 22. Cut into the cap 12 is an aperture or slot 24 through which will pass the electrical cable 36 which is held by the grommet of the present invention.

The shank portion 20 of the cap is of a diameter substantially equal to the inner diameter of the sleeve portion 10 so that the cap frictionally fits and is held in the sleeve portion 10. The flange 22 rests against lip 16.

A tab 26 is pivotably attached to the underside 28 of cap 12. Tab 26 is shaped so that it frictionally fits into slot 24. Thus, when no cable is passing through slot 24, tab 26 can be closed so that no opening appears in the cap 12 and it appears to be a solid surface. Tab 26 fits tightly enough frictionally so that it stays in place in slot 24 until pushed down to reopen slot 24.

Tab 26 has a connecting arm 30 which has a male connector comprising an elongated cylinder 32 at the end thereof. Cylinder 32 snap fits into a female receiver portion 34 which holds cylinder 32 yet allows it to pivot. Cylinder 32 can be pulled, with mild force, out of receiver portion 34 so that tab 26 can be separated from cap 12, if desired, and replaced when needed. Thus, this design allows the user to swing tab 26 down and out of the way if desired or it can be removed entirely.

Arm 30 is attached under tab 26 creating a step 37. Step 37 is necessary to pivot tab 26 so that it is flush with the top surface of cap 12 while arm 30 remains underneath cap 12 and out of the way.

In using the device of the present invention, a hole is drilled or cut into the panel, wall, board, desk or work surface 25 through which the electrical cable 36 is to pass. The sleeve portion 10 of the present invention is then pressed into place in the hole with rib 18 forming a means for the sleeve portion 10 to be frictionally held in place even if it is in a vertical direction. The rib 19 also provides a means to hold the sleeve in place if the hole has not been drilled precisely to the correct size and is slightly too big. Rib 18 also acts as a dam to hold glue if it is desired to glue sleeve 10 in place.

The electrical cable 36 is then passed through the hole in the panel, wall, desk or work surface which now contains sleeve 10, and then cap 12, with tab 26 pivoted down and out of the way, is placed over the cable and pressed into place, so that shank 20 frictionally fits into and is held in the inside diameter of the sleeve 10.

The aperture 24 that is cut into the cap 12 can be made of a variety of sizes and shapes depending upon the size of the electrical cable to be passed through the grommet or the size of the hole in the desk. Tab 26, of course, must conform to the size and shape of aperture 24.

The lip 16 of sleeve portion 10 will rest on the flat portion of the wall, panel, desk or work surface, holding the sleeve portion 10 in place, so that it will not fall through the hole. The rib 18 will prevent the grommet from slipping back and forth within the hole in which it is placed.

An additional advantage of the lip 16 and the cap 22 is the fact that when holes are cut into walls or desks there are usually rough edges or chips in the wood, and lip portion 16 will cover these unsightly chips. On steel or metal surfaces, the grommet prevents cutting of the cable by a rough metal edge.

Referring specifically to FIG. 3, there is clearly shown a 90 degree angle between the sleeve 14 and the lip 16. This 90 degree angle allows the lip 16 to rest on the surface of the work surface.

In addition, there is shown a beveled edge 38 on cap 12. The beveled edge 38 not only is aesthetic but will allow the sliding of objects over the top of cap 12 with very little resistance.

The grommet of the present invention can be made of any convenient material, such as plastic, metal, or wood, but is preferably made of plastic since it is easiest to produce and also is a non-conductive material in the event of any electrical cables which may have a problem of shorting or shocking a potential user.

The grommet of this invention also has the adaptability that the sleeve portion 10 can be used without the cap portion 12 in the event any cable or cables must be passed through the hole that fill the entire inside diameter.

In addition, two sleeve portions 10 can be placed back to back to cover both the top and bottom or both sides of a hole in a work surface or wall. Caps 12 can be placed on one or both sides.

Having thus described the invention with reference to a preferred embodiment, it will be understood by those skilled in the art the various changes in form and detail may be made therein without departing from the spirit and scope of the invention.

The invention claimed is:

1. A grommet cap set comprising: a sleeve comprising:
   a cylindrical inner surface defining a cylindrical hole to be covered, the inner surface forming a cylinder with an axial direction; and
   an outer surface, the outer surface being substantially cylindrical and having formed thereon at least one rib;
   a grommet cap having a substantially planar top side and an underside, the grommet cap comprising:
   a flange extending to an outer edge of the grommet cap and having a dimension larger than the hole to be covered;
   a shank depending downwardly from the underside of the grommet cap and having an outer surface with at least a substantial vertical portion configured cylindrically in conformance with the size and shape of at least a substantial portion of the inner surface of the sleeve, the outer edge of the grommet cap extending radially outside of the shank; and
   an aperture in the grommet cap extending in a radial direction through the flange from near a center of the flange to the outer edge of the grommet cap, the aperture elongated in the radial direction; and
   a non-captive closure member elongated in a longitudinal direction and having a first end and a second end, with the first end opposite the second end in the longitudinal direction, the first end comprising an arm elongated in the longitudinal direction, the non-captive closure member having a first extension extending in a direction perpendicular to the longitudinal direction and a second extension extending in a direction opposite that of the first extension, the second end of the non-captive closure member comprising a closure portion, the closure portion joining the arm at a step and being sized and shaped so as to match the aperture in the grommet cap, the closure portion having a top side, the top side of the closure portion being a planar surface elongated in the longitudinal direction;
   wherein the non-captive closure member is capable of being placed in at least the following three positions:
   a closed position in which the non-captive closure member rests in the radial direction, the closure portion of the non-captive closure member fills the aperture in the grommet cap, the planar top side of the closure portion is disposed in the radial direction and is substantially coplanar with the top side of the grommet cap, and the second end of the non-captive element is substantially contiguous with the outer edge of the grommet cap, the grommet cap and the non-captive closure member cooperating to appear as a solid surface;
   an open position in which the non-captive closure member is disposed completely under the grommet cap and supported at least partially by the first extension and the second extension which are non-captively held by a female receiver attached under the cap, with the second end of the non-captive closure member hanging below the first end at least ninety degrees below the cap, the first end being adjacent the underside of the grommet cap; and
   a separated position in which the non-captive closure member is removed entirely from and does not contact the grommet cap and the sleeve, and
   wherein the first and second extensions have a cross-section adapted to be pulled with mild force directly out of the female receiver, without a twisting motion, for removal of the extensions from the grommet cap.

2. A grommet cap set comprising:
   a sleeve having an inner surface defining a hole to be covered, generally forming a cylinder with an axial direction;
   a grommet cap having a substantially planar top side and an underside, the grommet cap comprising:
   a flange extending to an outer edge of the grommet cap and having a dimension larger than the hole to be covered;
   a shank depending from the underside of the grommet cap and having an outer surface with at least a substantial portion configured in conformance with the size and shape of at least a substantial portion of the inner surface of the sleeve;
   an aperture in the grommet cap extending in a radial direction through the flange to the outer edge of the grommet cap; and
   a closure element elongated in a longitudinal direction and having a first end and second end, with the first end opposite the second end in the longitudinal direction, the first end comprising an arm elongated in the longitudinal direction, the closure element having a first extension extending in a direction perpendicular to the longitudinal direction and a second extension extending in a direction opposite that of the first extension, the second end of the closure element comprising a closure portion, the closure portion joining the arm at a step and being sized and shaped so as to match the aperture in the grommet cap, the closure portion having a top side, the top side of the closure portion being a planar surface elongated in the longitudinal direction;
   wherein the closure element is capable of being placed in at least the following three positions:
   a closed position in which the closure portion of the closure element fills the aperture in the grommet cap, the planar top side of the closure portion is substantially coplanar with the top side of the grommet cap, and the second end of the closure element is substantially contiguous with the outer edge of the grommet cap;
   an open position in which the closure element is disposed under the grommet cap and supported at least partially by the extensions, which are held by a female receiver attached under the cap, with the second end substantially lower than the first end in the axial direction and
   a separated position in which the closure element is removed, entirely from and does not contact the grommet cap and the sleeve, and
   wherein the first and second extensions are adapted to permit removal of the closure element with mild force directly out of the female receiver, without a twisting motion, and to permit replacement of the closure element in the grommet after the removal, as desired by the user.

3. The grommet cap set of claim 2, wherein the closure element is non-captive.

4. A hole closure system comprising: a grommet cap comprising:
   a substantially circular disk having an aperture extending to the outer edge of the grommet cap, the disk having a diameter larger than a hole to be covered; and
   a projection projecting downwardly under the disk and having an outer surface with at least a substantial portion configured in conformance with a substantial portion of an inner surface of the hole to be covered, a portion of the projection being cylindrical, the outer edge of the grommet cap being radially outside of the projection; and a closure element elongated in a longitudinal direction and comprising:

a filler portion sized and shaped to fill the aperture in the grommet cap, the filler portion having a planar top elongated in the longitudinal direction;

an arm that meets the filler portion at a step, the arm being elongated in the longitudinal direction; and a pair of extensions protruding transverse to the longitudinal direction;

the closure element being moveable into at least the following three positions:

a closed position in which the filler portion substantially fills the aperture in the grommet cap and the closure element is adjacent the disk;

an open position in which the closure element is carried by its extensions which are removably held by a female receiver attached under the disk, without projection above the disk, the extensions being closer to the disk than is the filler portion, the filler portion hanging substantially lower than the extensions; and a separated position in which the closure element is removed entirely from and does not contact the grommet cap;

wherein the first and second extensions are capable of contacting the underside of the cap in both the open and closed positions, and are adapted for removal of the closure element with mild force directly out of the female receiver, without a twisting motion, and for replacement into the grommet cap after removal.

5. The hole closure system of claim 4, wherein the closure element is non-captive.

\* \* \* \* \*